United States Patent [19]

Nir et al.

[11] 4,437,263
[45] Mar. 20, 1984

[54] SYSTEM FOR HEAT STORAGE PARTICULARLY FOR USING IN AGRICULTURE

[75] Inventors: Aharon Nir, Rehovot; Abraham J. Amiel, Moshav Ramot Meir; Jonathan M. Krant, Ness Ziona, all of Israel

[73] Assignee: Yeda Research & Development Co. Ltd., Rehovot, Israel

[21] Appl. No.: 297,363

[22] Filed: Aug. 28, 1981

[30] Foreign Application Priority Data

Sep. 4, 1980 [IL] Israel ......................................... 60969

[51] Int. Cl.³ .......................... A01G 9/24; A01G 13/06
[52] U.S. Cl. ............................................ 47/1 R; 47/2; 47/19; 47/58
[58] Field of Search ........................... 47/1, 58, 2, 19; 165/45; 237/69; 126/271.2 A, 343.5 A

[56] References Cited

U.S. PATENT DOCUMENTS

| | | | |
|---|---|---|---|
| 1,758,941 | 5/1930 | Gibson | 47/2 X |
| 1,858,330 | 5/1932 | Horning | 47/1 |
| 1,904,001 | 4/1933 | Kimmel | 47/1 |
| 1,967,803 | 7/1934 | Boland | 47/2 X |
| 1,991,851 | 2/1935 | Hammell | 47/1 X |
| 3,521,699 | 7/1970 | Van Huisen | 126/343.5 A X |
| 4,216,614 | 8/1980 | Triplett | 47/2 |
| 4,309,843 | 1/1982 | Kato | 47/19 X |

FOREIGN PATENT DOCUMENTS

| | | | |
|---|---|---|---|
| 2616039 | 10/1977 | Fed. Rep. of Germany | 47/1 |
| 2728412 | 1/1979 | Fed. Rep. of Germany | 47/2 |
| 375184 | 6/1932 | United Kingdom | 47/58 |
| 631291 | 10/1949 | United Kingdom | 47/1 |

Primary Examiner—Clifford D. Crowder
Attorney, Agent, or Firm—Browdy and Neimark

[57] ABSTRACT

There is provided a system for the underground storage of heat for the gradual and controlled release of same for use in agriculture, comprising a plurality of heat conduits located at predetermined depths below the surface of the soil, and means for circulating heated water through said conduits. Preferred are two-layer systems and three-layer systems of such conduits.

13 Claims, 2 Drawing Figures

SYSTEM FOR HEAT STORAGE PARTICULARLY FOR USING IN AGRICULTURE

FIELD OF THE INVENTION

The present invention relates to a novel system of heat storage, especially for use in the storage of heat for use in the heating of greenhouses or of similar structures. The invention further relates to a system of heat storage based on the utilization of heat derived from solar collectors, of geothermal heat and of waste heat, especially from industrial sources.

The novel system allows the gradual predetermined release of heat from the storage system for heating purposes, and specifically for the warming of the soil at a predetermined depth, where roots of plants are located.

STATE OF THE PRIOR ART

Soil warming as a medium for heat supply to winter crops was studied widely during the last decade both experimentally and theoretically, the significant investigation being carried out in the U.S.A., U.S.S.R. and in Germany (Agrotherm Project) with the most extensive experimental advances being in the Agrotherm Project (Boersma et al, A System Analysis of the Economic Utilization of Warm Water Discharges from Power Generating Stations. Oregon State Univ., Bul. No. 48, 1974). (H. Luckow, the Agrotherm Research Project, Hearing before the House of Representatives, U.S.A., Int. Activities of ERDA, U.S. Govt. Printing Office, 1977).

An updated list of references and discussion of the theoretical aspects of recent work can be found in the associated proposal of Merbaum and Schweitzer (A. Merbaum and S. Schweitzer, Heat Transfer Models for a Subsurface Water Pipe, Soil-warming System. Volcani Center, Agric. Eng. Inst. Research Proposal, 1979) and Shapiro (H. N. Shapiro, Simultaneous Heat and Mass Transfer in Soil with Application to Waste Heat Utilization. Proc. 6th Int. Heat Transfer Conf., Vol. 3, p. 19, Toronto, 1978).

These investigations were intensified lately with an objective of utilization of waste heat of power plants, geothermal heat and of solar energy. However, the available results reveal several shortcomings with regard to local applications.

While heat may be continuously applied at relatively shallow depths (30–40 cm) in colder climates, if applied by day under local winter conditions it may cause overheating of the root zone with attendant water losses and increase in salinity. Application of heat at night only would require costly daily storage capacity for a solar system or doubling of the pumping and transport capacity for a waste heat system based on aquifer storage (A. Nir and J. Schwarz, Survey of Thermal Energy Storage in Aquifers Coupled with Agricultural Use of Heat Under semi-arid Conditions. Proc. Thermal Energy Storage in Aquifers Workshop, Berkely, 1978).

Heat can be stored seasonally, from summer to winter in deeper soil or in groundwater aquifers, but this method necessitates continuous monitoring, control and transport of heat from storage to the area of application, with attendant losses in storage and complexity of equipment.

SUMMARY OF THE INVENTION

According to the present invention there is provided a heat storage system for the storage of heat obtained from solar collectors, of geothermal heat or of industrial waste heat, and wherein means are provided for the gradual predetermined release of such heat for any desired purpose. According to a preferred embodiment of the invention there is provided a stratified system for the circulation of a heated fluid at various depths below the surface of the earth. According to one preferred embodiment there is provided a two-layer system. The most preferred embodiment of the invention comprises a three-layer system. With the three-layer system a preferred embodiment comprises a pipe system located about 50± cm below the surface; the second system is located about 100 to 200 cm beneath the surface, while the third layer is located at a depth of about 3 to 10 meters below the surface of the soil. The conduits of fluids are preferably pipes, which may be made of a polyalkylene (polyethylene or polypropylene) or any other suitable material. The lowermost conduit is advantageously made of similar pipes in spiral configuration placed in well borings or of flat plate heat exchangers. Advantageously about 16 such bore holes are provided per 1000 $m^2$. Pipes of about 20 to 30 mm diameter give satisfactory results. These are advantageously positioned beneath flower beds, the lowermost heat-exchangers being advantageously located in the central area of the greenhouse.

The general idea of the stratified storage is that heat is introduced into the soil below the vegetation area at various distances from the ground level. Heat collected on winter days is closest (the upper layer). The heat is allowed to diffuse freely to the root zone of the vegetation, reaching it during the following night, when it is really needed.

The heat collected in fall is stored deeper in the soil (the intermediate layer) and that collected in summer still deeper (the lower layer). In this way the upper soil is fortified in advance to have the average demand of heat supplied to it without the need for continuous monitoring and transport of heat.

However, if the heat demand is particularly high at some period, there is an option to transfer it from the lower layer to the upper by circulation of water between these layers.

DETAILED DESCRIPTION

Figure 2:
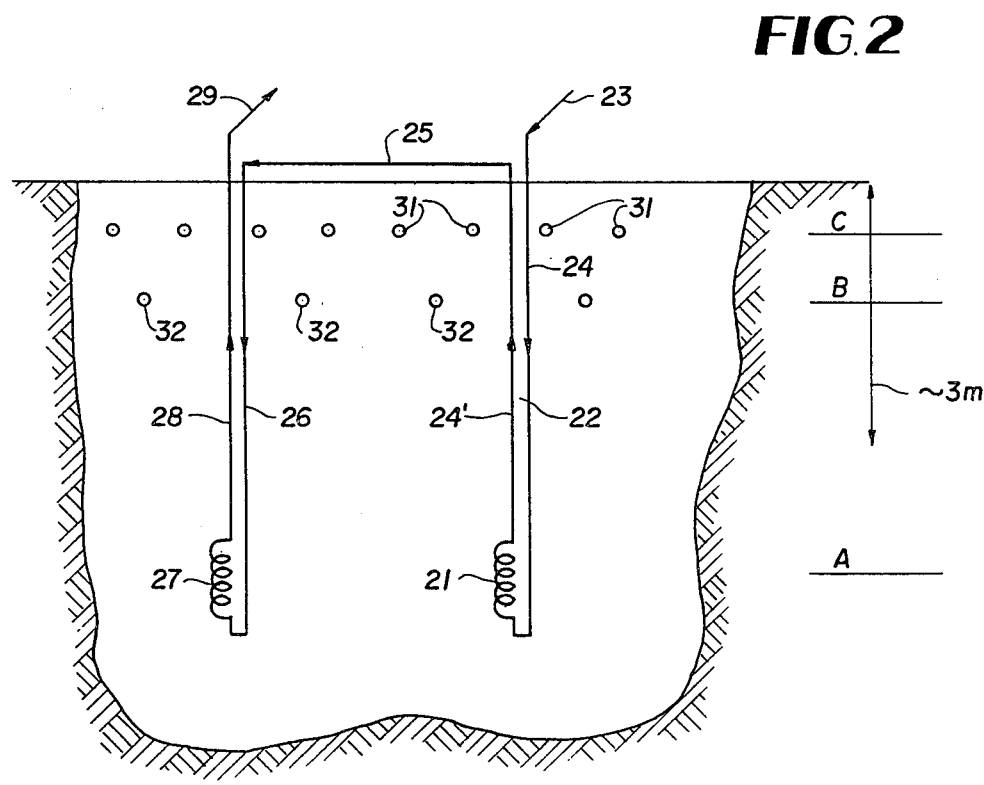
FIG. 2 is a vertical cross-sectional view through the system taken on the line x—x of FIG. 1.

Referring now in detail to the drawings, the levels A, B and C indicate deepest, intermediate and shallow layers, respectively. More in detail, the drawings show a plurality of pipes 21 arranged with spiral coils at the lower end located in the bore holes 22. Hot water is introduced at 23 by a conduit 24, and this water passes via spiral 21 and via the conduits 24' and 25 into the next bore hole, via conduit 26, through spiral 27 and via conduit 28 to the exit 29. The water is thereafter recirculated to heating means, not shown. The showing of FIG. 2 is indicative of a predetermined pattern of such bore holes covering the area over which the soil is to be heated.

The layers comprise a plurality of parallel pipes 31 at the shallow depth, preferably 50 to 60 cm, and another layer of conduits 32 at an intermediate depth of about 120 cm below the surface of the soil.

Means are provided to interconnect the pipes to permit the flow of hot water to them and between the layers. To this end, pipes 31 meet at 33 and are connected to the hot water entry port 34, the same pipes 31 meeting at 35 and the water leaving via exit port 36. The pipes 32 meet at 37 which receives hot water by a conduit means 38 and 39, the same pipes meeting at exit 40. Thereafter, the water leaves via valve means 41 and exit conduit 42. The connections to the spiral pipes 21 and 27 are via 43 and 44, by means of which the direction of flow can be reversed, as indicated, in order to control the inter-layer flows of water.

Figure 1:
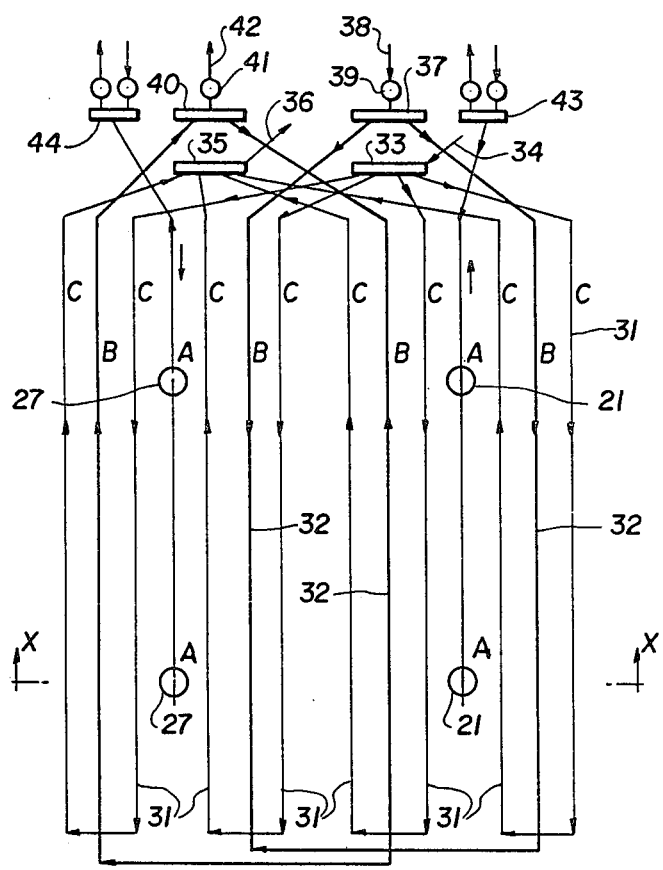
FIG. 1 is a top plan primarily schematic view of the invention system in place in the soil.

The "plumbing" required to implement the system is notoriously well known, nothing more than ordinary pipe interconnections, valves, pumps, or the like, being required. Thus, the showing of FIGS. 1 and 2 are merely exemplary of many embodiments.

Heat is stored in protected soils, e.g. in greenhouses or under other structures in the unsaturated water zone, which is not subject to direct uncontrolled infiltration. The sources of the heat are: solar water collectors, geothermal hot waters and industrial waste heat at temperatures of 30°–80° C.

The heat is introduced into several horizontal layers through the use of water pipes with heat conducting walls or alternately heat exchangers, which are made of metal or plastic.

The selection of the depth of the storage layer is made on the basis of the following considerations:
(a) The upper layer (at 50±10 cm depth) delivers the heat stored by day during the following night by direct conduction to the surface and to the vegetation root zone.
(b) The second (intermediate) layer (at 100–200 cm depth) serves as a backup to the upper layer in case of several days of lower supply or higher demand at the upper level. Heat is stored in this layer from days to weeks before the actual demand.
(c) The lower layer (at 3–10 meters depth) serves as seasonal storage, e.g. stores heat from summer to winter. Heat is recovered by recirculation of water between these layers and the upper layer.
(d) The deposition and extraction of heat in the lower layer is controlled through an underground drip irrigation pipe placed above it. This device utilizes the extremely high sensitivity of heat conduction in unsaturated soils to their water content. Even small quantities of water applied by such drip irrigation increases appreciably the heat conduction of the soil.

The depth of the upper layer and the water temperature are determined by model calculation and experimental calibration to fulfill the following conditions:
(a) Avoid heat escape by day or at high surface temperatures;
(b) Not to cause overheating of the root zone;
(c) Not to cause excessive soil drying in the pipe area;
(d) Reach the root zone and soil surface at night or at low surface temperatures.

This determination takes therefore into account the following parameters:
(a) Input water temperature;
(b) Soil thermal properties;
(c) Soil water regime and hydrological properties;
(d) Climatic conditions;
(e) Physiological requirements of plants (in case of greenhouses).

SUMMARY OF THE INVENTION

The invention offers a solution for simple and inexpensive heat storage in protected soils at low temperatures. The heat is stored in stratified layers in upper soil and released according to the heat requirements of the top layers. This obviates the need for a separate storage and control mechanism.

EXAMPLE

This example is based on data for a greenhouse situated on the coastal plain of Israel, with the upper soil being sandy, and under normal winter irrigation schedule and atmospheric conditions.

The operational parameters are these:
Upper layer: 20 mm diameter polyethylene water pipes running under the flower beds at 60 cm depth.
Intermediate layer: Similar pipes at depth of 120 cm.
Lower layers: 32 mm diameter polyethylene pipes in spiral configuration, placed in 1 meter diameter wells, at depth of 4 to 7 meters in the central area of the greenhouse. Advantageously about 16 such bore holes are provided per 1000 m$^2$.
Drip irrigation layer: A single coil of porous water pipe placed above the lower layer spiral.

The relevant data of average performance for this layout are (in M Joules/m$^2$/day):

| Layer | Period | Energy, stored | Energy released to Greenhouse | Comments |
|---|---|---|---|---|
| Upper | daily Dec.–April | 1–1.4 | 0.8–1.2 | |
| Intermediate | November | 1.5 | 0.3 | |
| Lower | May October | 1–1.2 | 0.7–0.8* | *Released in winter according to daily requirements |

The root zone average temperature would be as follows (°C., at 25 cm depth):

| Heat/Month | December | January | February | March |
|---|---|---|---|---|
| Unheated | 15–17 | 15–17 | 15–17 | 16–19 |
| Heated | 21–22 | 20–22 | 20–22 | 20–20 |

The system can be adjusted to variable weather conditions. The decisions and available actions are described in Table I.

TABLE I

| | | | HEAT STORAGE DECISION ANALYSIS | |
|---|---|---|---|---|
| Season | Day Night | Basic Operation | Alternative or additional operation | Comments |
| 1. Summer | Day | 1.1 Store in deep layer (3) | | |
| | Night | | 1.2 Recirculate collector to top layer (1)* | *When root cooling required |

TABLE I-continued
HEAT STORAGE DECISION ANALYSIS

| Season | Day Night | Basic Operation | Alternative or additional operation | Comments |
|---|---|---|---|---|
| 2. Fall | Day | 2.1 Store in intermediate layer (2) | 2.2 Store in top layer (1)* | *Early root warming required |
|  | Night |  | 2.3 Recirculate collector to top layer** | **Root cooling required |
| 3. Winter | Day | 3.1 Store in top layer (1) | 3.2 Store in intermediate layer (2)* | *Warm weather |
|  | Night |  | 3.3 Recirculate deep layer to collector in air heating mode** | **Air warming required |
|  |  |  | 3.4 Recirculate deep to top layer (1)*** | ***Additional root warming required |

While the invention has been described in detail above, it is to be understood that this detailed description is by way of example only, and the protection granted is to be limited only within the spirit of the invention and the scope of the following claims.

We claim:

1. A system for use in agriculture for the underground storage of heat in soil and for the predetermined release of the stored heat in response to both daily and seasonal demands for the heat, comprising three stratified layers of fluid conduits located at shallow, intermediate and deepest depths below the surface of the soil, and means for circulating heated fluid through said conduits and between said conduits in said three layers.

2. A system according to claim 1, said layers comprising fluid conduits located about 40 to 80 cm depth, at about 100 to 200 cm depth and at about 3 to 10 meters depth below the surface respectively.

3. A system according to claim 1, wherein a plurality of bore holes reaching to said deepest layer are provided, and said deepest layer conduits comprising spiral conduit means located at the lowermost depth of each bore hole.

4. A system according to claim 1, said shallow layer comprising pipes at about 50±10 cm and the intermediate layer comprising pipes at about 100 to 200 cm below the surface.

5. A system according to claim 1, said circulating heated fluid comprising water heated by solar energy, by geothermalheat or industrial waste heat.

6. A system according to claim 1, wherein all of said fluid conduits are plastic pipes.

7. A method of storing heat in soil for agricultural use to respond to daily and seasonal demands for heat, comprising the steps of providing three stratified layers of fluid conduits located at shallow, intermediate and deepest depths below the surface of the soil, circulating heated fluid from the surface through said shallow layer to provide heat to the surface and the roots of the agricultural plants on a relatively short daily time cycle, circulating heated fluid through said intermediate layer to store heat in the soil in the vicinity of said intermediate layer to permit said heat to diffuse up to the surface and to the roots of the plants on a relatively longer cycle, and circulating heated fluid from the surface through said deepest layer to store heat in the soil in the vicinity of said deepest layer to store said heat on a seasonal basis.

8. The method of claim 7, and circulating fluid between said layers to move the stored heat correspondingly in response to daily and seasonal demands for said heat.

9. The method of claim 7, wherein said system is used in greenhouses.

10. The method of claim 7, locating said shallow layer at about 40 to 80 cm, said intermediate layer at about 100 to 200 cm and said deepest layer at about 3 to 10 meters below the surface respectively.

11. The method of claim 7, and using at least one of solar energy, geothermal heat and industrial waste heat as the source of the stored heat.

12. The method of claim 7, providing bore holes reaching to said deepest layer depth, and positioning said deepest layer conduits in the form of coils of plastic pipe in the lowermost end of said bore holes.

13. The method of claim 7, and the step of providing predetermined quantities of water to the soil in the vicinity of said deepest depth to increase the heat storage ability of said soil in said vicinity.

* * * * *